Jan. 16, 1962  V. R. BRIGGS  3,017,109
PULSE WIDTH SIGNAL MULTIPLYING SYSTEM
Filed Aug. 12, 1958  3 Sheets-Sheet 1

VERNON R. BRIGGS
INVENTOR.

BY
ATTORNEY

Jan. 16, 1962　　　V. R. BRIGGS　　　3,017,109
PULSE WIDTH SIGNAL MULTIPLYING SYSTEM
Filed Aug. 12, 1958　　　　　　　　　　3 Sheets-Sheet 2

(a)  Zero Axis (b)

(c)

(d)

(e)

(f)

Vernon R. Briggs
INVENTOR.

BY 
ATTORNEY

Jan. 16, 1962 V. R. BRIGGS 3,017,109
PULSE WIDTH SIGNAL MULTIPLYING SYSTEM
Filed Aug. 12, 1958 3 Sheets-Sheet 3

Vernon R. Briggs
INVENTOR.

BY Robert H. Fraser
ATTORNEY

United States Patent Office 3,017,109
Patented Jan. 16, 1962

3,017,109
PULSE WIDTH SIGNAL MULTIPLYING SYSTEM
Vernon R. Briggs, Los Angeles, Calif., assignor, by mesne assignments, to Thompson Ramo Wooldridge Inc., Cleveland, Ohio, a corporation of Ohio
Filed Aug. 12, 1958, Ser. No. 754,616
14 Claims. (Cl. 235—194)

This invention relates to signal multiplying systems and more particularly to an improved signal multiplying system utilizing a signal train comprising width modulated pulses in which an output signal is generated representing the product of multiplier and multiplicand input signals of either polarity.

In analog computer circuits in which manipulations and computations are performed by means of fluctuating electrical signals, it is frequently necessary to generate a voltage representing the product of the value of independently variable voltages representing a multiplier and a multiplicand. Although it is known to employ closed loop servo systems which position mechanical elements in the multiplication of electrical signals, it has been found that the inertia of the mechanical parts of the system limits the upper frequency response. In addition, in order to provide a reasonable degree of accuracy in the multiplication process, the mechanical parts of a servo system must be constructed with a high degree of precision which in many instances makes the servo system prohibitively expensive. Other known arrangements for the multiplication of electrical signals which operate without moving mechanical parts generally suffer from a lack of accuracy or are relatively complex. Another disadvantage of many known non-mechanical signal multiplying arrangements is that one or both of the input signals which may be accepted for multiplication may only be of one polarity.

Accordingly, it is an object of the present invention to provide a new and improved system for generating a voltage representing the product of two input signals.

It is another object of the present invention to provide a new and improved system for multiplying two input voltages by means of a simple electrical circuit having no mechanical moving parts.

It is yet another object of the present invention to provide a new and improved multiplying system in which input voltages may be of either polarity with the output signal representing the product of the input voltages.

It is still another object of the present invention to provide a new and improved system for generating a signal train of width modulated pulses, the individual width of each pulse representing the value of an input voltage representing signal intelligence.

Briefly, in accordance with one aspect of the invention, there is provided a system for generating an output voltage which is proportional to the product of the values of two input voltages in which a first input voltage is combined with an alternating wave to form a composite signal, the composite signal is applied to an inductively loaded bridge rectifier circuit to generate a signal train of width modulated pulses, and a pair of separate signal paths are alternately enabled to pass a second input signal to an output circuit in response to the width modulated pulses so that a voltage is produced in the output circuit representing the product of the values of the two input signals.

One particular feature of the invention is directed to a system for generating a signal train of width modulated pulses in which a bridge rectifier circuit receives a composite signal having an alternating current component and a component representing an input signal. A constant current load is connected across the bridge rectifier circuit so that the current flowing through the bridge rectifier circuit takes the form of electrical pulses which are width modulated as a function of the value of the input signal.

In accordance with another aspect of the invention, a switching wave comprising a signal train of width modulated pulses representing the value of a first input signal is applied to a pair of bi-directional signal responsive switches which are alternately enabled to pass opposite polarity versions of a second input signal to an output circuit for periods dependent upon the value of the first input signal whereby the signal developed in the output circuit represents the product of the values of the first and second input signals.

In one illustrative embodiment of the invention described below, a polarity reverser is connected serially with one bi-directional signal responsive switch to produce a product output voltage in a single-ended output circuit. By virtue of the use of bi-directional signal responsive switches in conjunction with the means for generating a signal train of width modulated pulses of the invention, a signal multiplying system is provided having a high degree of accuracy and which is capable of accepting input signals in any combination of polarities, with an output signal appearing in the output circuit representing the product of the absolute values of the input signals as well as having a polarity corresponding to a multiplication of the polarities of the input signals.

A better understanding of the invention may be had from a reading of the following detailed description and an inspection of the drawings, in which.

Figure 1:
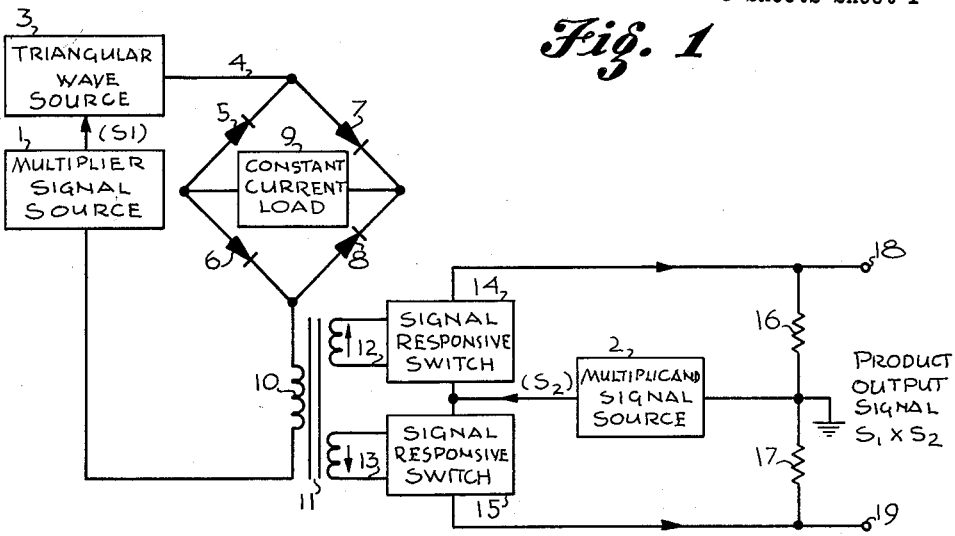
FIG. 1 is a combined block and schematic circuit diagram of a signal multiplication system in accordance with the invention.

In FIG. 1 there is shown a signal multiplying system for producing an output voltage which is proportional to the product of two independently variable input signals which may be identified as a multiplier input signal and a multiplicand input signal. The multiplier input signal $S_1$ appears at the output of a multiplier signal source 1 while a multiplicand input signal $S_2$ appears at the output of a multiplicand signal source 2. The multiplier signal $S_1$ from the multiplier signal source 1 is applied to a special arrangement in accordance with the invention for generating a signal train comprising pulses which are width modulated in accordance with the value of the multiplier signal $S_1$.

Connected serially with the multiplier signal source 1 is a source of waves having an alternating current component, as for example, a triangular wave source 3. A triangular wave from the triangular wave source 3 is added to the multiplier signal $S_1$ to produce a composite signal on a lead 4. Accordingly, where FIG. 2a represents the waveform of a triangular wave from the triangular wave source 3, a composite signal appearing on the lead 4 corresponds to FIG. 2a when the value of the multiplier signal $S_1$ is equal to zero. In the presence of a finite value of multiplier signal $S_1$, the triangular wave of FIG. 2a is displaced from its zero axis by an amount equal to the value of the multiplier signal $S_1$. Accordingly, FIG. 2c represents the composite signal appearing on the lead 4 for a given value of a multiplier signal $S_1$ of one polarity while FIG. 2e represents the composite waveform appearing on the lead 4 where the value of the multiplier signal $S_1$ is of opposite polarity.

The composite signal appearing on the lead 4 including both the triangular wave component and the component representing the multiplier signal $S_1$ is applied to a bridge rectifier circuit which may include four diodes 5, 6, 7 and 8 connected as illustrated. As is well known, where a resistive load is placed across a bridge rectifier circuit, the current flow through the bridge rectifier circuit closely follows the fluctuations in applied voltage. However, in the special configuration of the invention illustrated in FIG. 1, a constant current load 9 is connected across the bridge rectifier circuit comprising the diodes 5–8 which alters the voltage-current characteristic to produce a signal train of width modulated pulses. In operation, the constant current load 9 tends to maintain a constant value of current flow between the two corners of the bridge to which it is connected. Accordingly, where the composite wave on the lead 4 rises above a zero axis value, a current path is provided through the bridge rectifier circuit via the diode 7, the constant current load 9 and the diode 6. In contrast, when the composite signal appearing on the lead 4 drops below a zero axis value, a current path is provided through the bridge rectifier circuit via the diode 5, the constant current load 9 and the diode 8. However, since the constant current load 9 tends to sustain a constant value of current flow between the terminals defining one diagonal of the bridge at all times, the composite signal appearing on the lead 4 functions to switch alternately the current flow from one of the above described circuit paths to the other.

Figure 2:
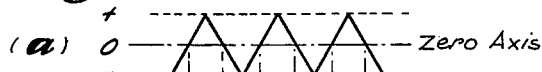
FIG. 2 is a set of graphical illustrations of various voltages and currents appearing in the system of FIG. 1.
Figure 2:
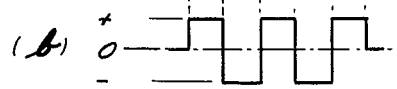
Figure 2:
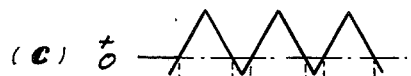
Figure 2:
Figure 2:
Figure 2:
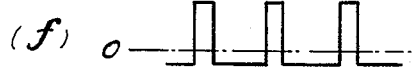
Figure 2:
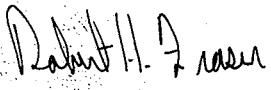

Referring again to the graphical illustration of FIG. 2, FIG. 2b represents the current flow through the bridge circuit of the rectifiers 5–8 where the multiplier signal $S_1$ is equal to zero and the triangular wave from the triangular wave source 3 is equally disposed around the zero axis as illustrated in FIG. 2a. In a similar fashion, FIG. 2d represents the current flow through the bridge rectifier circuit of the diodes 5–8 in response to a composite signal such as that illustrated in FIG. 2c in which a positive value of the multiplier signal $S_1$ appears along with the triangular wave component in the composite wave on the lead 4. It will be noted in FIGS. 2b and 2d that each time the triangular wave component crosses the zero axis the direction of the current flow through the bridge circuit is reversed so as to produce a signal train of pulses having a width corresponding to the value of the multiplier signal $S_1$. Where the multiplier signal $S_1$ is of negative value, the waveform of FIG. 2f illustrates the resultant current flow through the bridge circuit in response to a composite signal on the lead 4 as illustrated in FIG. 2e. Again it will be noted that each time the triangular wave component crosses the zero axis, the direction of current flow through the bridge rectifier circuit is reversed, producing a signal train of pulses having a width corresponding to the value of the multiplier signal $S_1$.

By connecting a low impedance, such as the impedance appearing across the primary winding 10 of a transformer 11, serially with the bridge circuit of the diodes 5–8, a signal train may be derived representing the current flow through the bridge circuit. Although the special arrangement of a constant current loaded bridge circuit to which is applied a composite signal having an alternating current component and a component representing an input signal may be used to advantage wherever it is desired to generate a signal train comprising width modulated pulses, in the signal multiplying system of FIG. 1 the arrangement is particularly useful in generating a switching wave which appears across two secondary windings 12 and 13 of the transformer 11 for alternately enabling two signal responsive switches 14 and 15 to pass a multiplicand signal $S_2$ from the multiplicand signal source 2.

In the signal multiplying system of FIG. 1, the signal responsive switches 14 and 15 provide two separate circuit paths through which the multiplicand signal $S_2$ alternately passes. The upper circuit path includes the signal responsive switch 14 connected between the multiplicand signal source 2 and a resistor 16, and a lower circuit path includes the signal responsive switch 15 connected between the multiplicand signal source 2 and a resistor 17. The resistors 16 and 17 together form an output circuit for the signal multiplying system.

In operation, the switching wave comprising the width modulated pulses is applied to the signal responsive switches 14 and 15 and functions alternately to enable each of the switches 14 and 15 to pass the signal from the multiplicand signal source 2 via the upper and lower circuit paths. Thus, during positive going pulses of the switching wave appearing across the primary winding 10, the upper signal responsive switch 14 is actuated to pass the signal from the multiplicand signal source 2 to the resistor 16. In contrast, the lower signal responsive switch 15 is actuated by pulses of negative going polarity appearing across the primary winding 10. Since pulses of negative going polarity correspond to the intervals between the width modulated pulses appearing across the primary winding 10, the signal responsive switches 14 and 15 are alternately enabled to pass the multiplicand signal $S_2$ for periods which correspond to the value of the multiplier signal $S_1$. The result is that the voltages across the resistors 16 and 17 tend to cancel and a net voltage appears between the output terminals 18 and 19 having a value which is proportional to the product of the multiplier signal $S_1$ and the multiplicand signal $S_2$.

A particular feature of the circuit of the invention as illustrated in FIG. 1 is that the signals from the multiplier and multiplicand signal sources 1 and 2 may be of either polarity, with an output voltage appearing at the terminals 18 and 19 proportional to the value of the product and having the proper sign, i.e., polarity. Accordingly, the multiplier and multiplicand input signals displayed in any one of the four quadrants of a conventional graphical illustration may be accepted by the signal multiplying system of the invention for multiplication. Therefore, the multiplying system of the invention may be said to have the capability of four quadrant operation.

Figure 3:
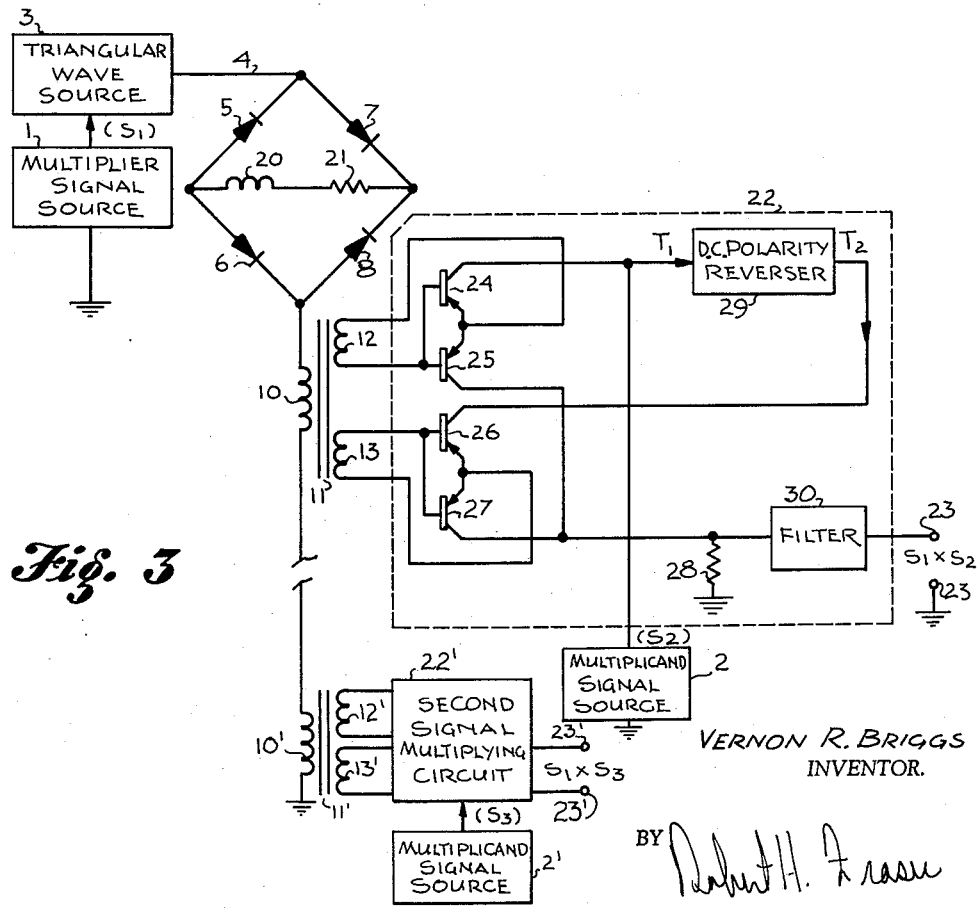
FIG. 3 is a combined block and schematic circuit diagram of an alternative signal multiplying system in accordance with the invention.

Although the signal multiplying system of FIG. 1 performs satisfactorily when the output voltage taken from the terminals 18 and 19 is applied to an output circuit which is floating with respect to ground, where one side of an output circuit is grounded, a single-ended output is required. An alternative arrangement of a signal multiplying system in accordance with the invention for providing a single-ended output signal is illustrated in FIG. 3 in which like reference characters have been used to identify portions of the circuit having a function similar to that described above in connection with FIG. 1. In addition, FIG. 3 illustrates certain specific circuit arrangements of parts designated functionally in FIG. 1, along with an arrangement for multiplying a plurality of multiplicand signals by a single multiplier signal.

In FIG. 3 a multiplier signal source 1 supplies a signal $S_1$ which is combined with a triangular wave from a triangular wave source 3 to form a composite signal on the lead 4 which is applied to a bridge rectifier circuit including the diodes 5–8. The bridge rectifier circuit of FIG. 3 is inductively loaded by means of an inductance 20 connected serially with a resistor 21. The inductance 20 and the resistor 21 function as a constant current load which tends to sustain a substantially constant current across opposite corners of the bridge as described above in connection with FIG. 1. The result of the cooperation between the constant current load afforded by the inductance 20, the resistor 21 and the bridge rectifier circuit is that a signal train of width modulated pulses appears across a primary winding 10 of a transformer 11. If desired, any number of additional primary windings such as the primary winding 10′ associated with additional multiplying circuits may be connected serially with the primary winding 10 to generate output signals representing the product of the multiplier signal $S_1$ and a plurality of multiplicand signals such as the multiplicand signal $S_2$ from the multiplicand signal source 2 and the multiplicand signal $S_3$ from the multiplicand signal source 2'. For this purpose, a first signal multiplying circuit 22 including a pair of signal responsive switches may be connected to the secondary windings 12 and 13 of the transformer 11, and other signal multiplying circuits such as the second signal multiplying circuit 22' may be connected to other secondary windings such as the secondary windings 12' and 13' associated with the transformer 11'. The result is that an output signal appears across the output terminals 23 representing the product of the multiplier signal $S_1$ and the multiplicand signal $S_2$ and an additional output signal appears across the output terminals 23' representing the product of the multiplier signal $S_1$ and the multiplicand signal $S_3$.

The first signal multiplying circuit 22 includes two signal responsive switches which are alternately actuated by the switching wave appearing across the primary winding 10 of the transformer 11. An upper signal responsive switch connected to the secondary winding 12 includes a pair of transistors 24 and 25, and a lower signal responsive switch connected to the secondary winding 13 includes a pair of transistors 26 and 27. Each of the signal responsive switches of the first signal multiplying circuit 22 is bi-directional in character and is capable of passing signals from the multiplicand signal source 2 of either polarity. The appearance of a positive going pulse in the electrical signal train appearing across the primary winding 10 biases the transistors 24 and 25 in a forward direction so that the multiplicand signal $S_2$ is passed from collector to emitter of the transistor 24 and from emitter to collector of the transistor 25, thereby appearing across an output impedance in the form of a resistor 28.

In contrast, the transistors 26 and 27 of the lower signal responsive switch are biased in a forward direction by negative going excursions of the switching wave corresponding to intervals between width modulated pulses. When the transistors 26 and 27 are biased in a forward direction, a reversed polarity multiplicand signal $S_2$ from a D.C. polarity reverser 29 is passed to the resistor 28 via the collector and emitter of the transistor 26 and the emitter and collector from the transistor 27.

In response to the alternate positive and negative going excursions of the switching wave appearing across the primary winding 10, the upper signal responsive switch of the transistors 24 and 25 and the lower signal responsive switch of the transistors 26 and 27 are alternately rendered conducting to apply the multiplicand signal $S_2$ to the output resistor 28 in alternately opposite polarity. The resultant signal across the resistor 28 includes an average component which represents the product of the multiplier signal $S_1$ and the multiplicand signal $S_2$. In order to separate the component which represents the product signal and to smooth the output signal, a low-pass filter 30 may be connected between the output resistor 28 and the output terminals 23. The filter 30 functions to remove unwanted alternating current components so that only the component of the signal representing the product appears at the output. Since a single output resistor 28 is employed in the system of FIG. 3, with the reversals in polarity being accomplished by alternately applying the multiplicand signal $S_2$ directly and indirectly via the D.C. polarity reverser 29, the output from the system of FIG. 3 is single-ended and may be employed in conjuction with terminal equipment having one side grounded.

Other additional signal multiplying circuits such as the signal multiplying circuit 22' may be identical in construction with the signal multiplying circuit 22 described above. Therefore, in the system of FIG. 3 a multiplier signal $S_1$ may be multiplied by any desired number of multiplicand signals if desired. The break mark in the connection between the primary winding 10 and the primary winding 10' is intended to indicate that any desired number of signal multiplying circuits may be employed.

Figure 4:
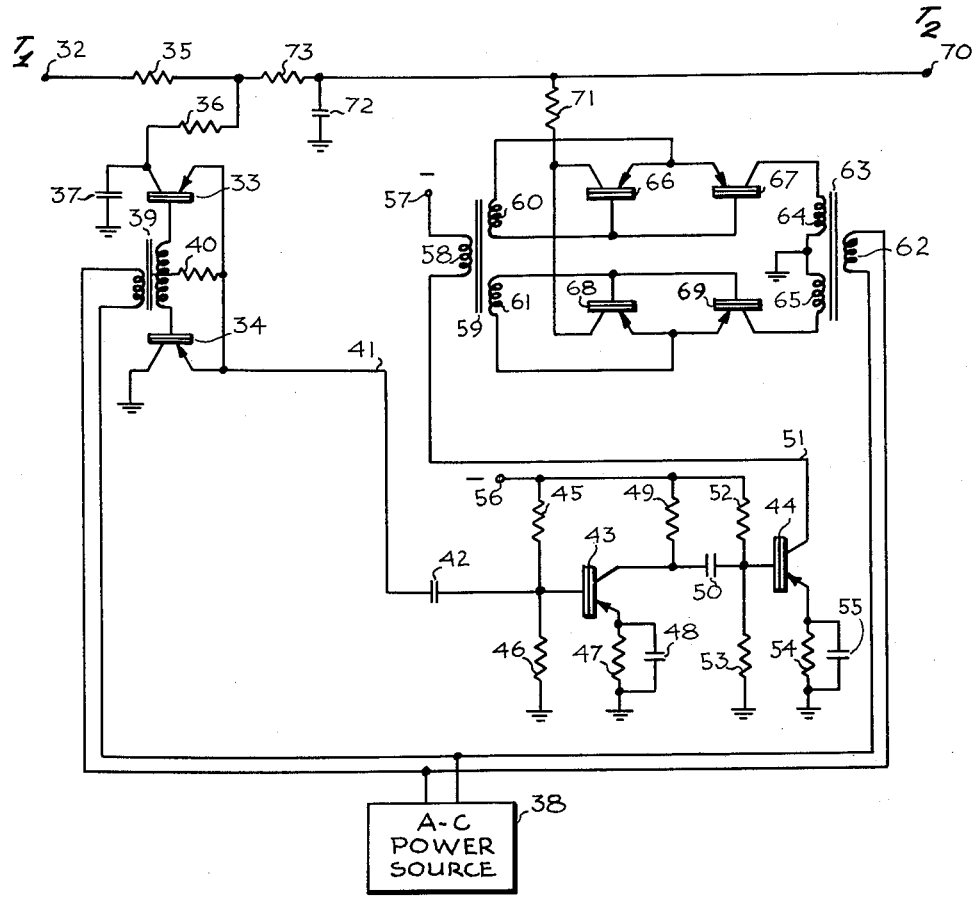
FIG. 4 is a combined block and schematic circuit diagram of a D.C. polarity reverser for use in the signal multiplication system of FIG. 3.

FIG. 4 illustrates one form of a D.C. polarity reverser which may be used in the signal multiplying system illustrated in FIG. 3. The arrangement of FIG. 4 functions to provide an output voltage of opposite polarity and equal value to an input voltage. In overall operation, signals applied to the terminal $T_1$ of FIG. 4 are used to modulate an amplitude modulated wave which is synchronously demodulated to recover an output signal which appears at the terminal $T_2$. By means of a feedback, the overall gain of the arrangement of FIG. 4 is maintained equal to one.

An input signal applied to the $T_1$ terminal 32 of FIG. 4 is passed to a modulator circuit including a pair of transistors 33 and 34 via a pair of resistors 35 and 36. The input signal is applied to the collector of the upper modulator transistor 33 which may be returned to ground reference potential by means of a capacitor 37 which forms a filter in conjunction with the resistor 36 to by-pass unwanted alternating current components to ground. The modulator transistors 33 and 34 function to convert a D.C. voltage applied to the terminal 32 to an amplitude modulated carrier wave. By means of an alternating current wave from the A.C. power source 38 passed by a transformer 39, the transistors 33 and 34 are alternately biased in a forward direction and alternately rendered conducting. The transistors 33 and 34 share a common emitter circuit resistor 40 which is returned to the center tap of a secondary winding of the transformer 39. When the upper modulator transistor 33 is biased in a forward direction, a signal applied to the $T_1$ terminal 32 is passed to the lead 41. When the lower modulator transistor 34 is biased in a forward direction, the lead 41 is grounded via the transistor 34. The result is that the signal applied to the $T_1$ terminal 32 appears on the lead 41 on alternate half-cycles of the wave from the A.C. power source 38 as an amplitude modulated carrier wave. Thus the modulator transistors 33 and 34 function as the equivalent of a conventional single-sided mechanical chopper to produce a modulated alternating current wave corresponding to the signal applied to the $T_1$ terminal 32.

The alternating current wave appearing on the lead 41 is passed by a coupling capacitor 42 to a two-stage amplifying circuit including a transistor 43 and a transistor 44. Connected to the first stage transistor 43 are the conventional biasing resistors 45 and 46, an emitter resistor 47, a by-pass capacitor 48 and a collector resistor 49 across which appears an amplified alternating current wave corresponding to the wave appearing on the lead 41. The second stage transistor 44 further amplifies the alternating current wave passed by a coupling capacitor 50 to produce an amplified alternating current wave on a lead 51 having the same phase as the wave on the lead 41. Connected to the second stage transistor 44 are conventional biasing resistors 52 and 53, an emitter resistor 54 and a by-pass capacitor 55. Suitable negative operating potential may be applied to the amplifying circuit of the transistors 43 and 44 by means of the terminals 56 and 57 from a conventional power supply (not shown).

The amplified alternating current wave from the second stage transistor 44 appears across a primary winding 58 of a transformer 59 having a pair of secondaries 60 and 61. The circuit connected to the secondary windings 60 and 61 functions as a demodulator which compares the alternating current wave appearing across the primary winding 58 with a wave from the A.C. power source 38 applied to a primary winding 62 of a transformer 63 having a pair of secondary windings 64 and 65. The demodulator circuit includes four transistors 66, 67, 68 and 69 which are interconnected as a synchronous demodulator to provide an output signal at the $T_2$ terminal 70 corresponding to the signal applied to the $T_1$ terminal 32 but of opposite polarity.

The reversal in polarity is accomplished in the apparatus of FIG. 4 by comparing the wave appearing across the primary winding 58 with a wave from the A.C. power source 38 which is of opposite phase to that applied to the primary winding of the transformer 39. That is, in the modulation operation, the wave appearing on the lead 41 is of one phase corresponding to the phase of the wave from A.C. power source 38 applied to the primary winding of the transformer 39 associated with the modulator, and the wave applied to the winding 62 from the A.C. power source 38 is of opposite phase. The result is that the signal appearing at the output of the demodulator circuit is of a polarity opposite to that of the polarity of the voltage applied to the $T_1$ terminal 32.

In order to achieve an overall gain equal to one, so that the signal appearing at the $T_2$ terminal 70 will be exactly equal and opposite to the voltage applied to the $T_1$ terminal 32, the output signal from the demodulator circuit is passed through a filter comprising a resistor 71 and a capacitor 72 to a feedback resistor 73. The filter functions to remove alternating current signals produced in the modulation and demodulation process, and the feedback resistor 73 passes a negative feedback signal which reduces the overall gain.

By making the input resistor 35 and the feedback resistor 73 of equal value, an overall gain of one results so that the signal appearing at the $T_2$ terminal 70 is equal in value to the signal applied to the $T_1$ terminal 32. Since the signal appearing at the $T_2$ terminal 70 is of opposite polarity to the signal applied to the $T_1$ terminal 32, the apparatus of FIG. 4 may be included in the system of FIG. 3 as a D.C. polarity reverser.

In the specific arrangements of FIGS. 3 and 4, the various transistors have each been illustrated by the conventional symbol for a P-N-P type transistor, i.e., the arrow representing the emitter points inwardly. It is well known that N-P-N type transistors may be readily substituted, if desired, by modifying the operating potentials and biasing circuits.

Figure 5:
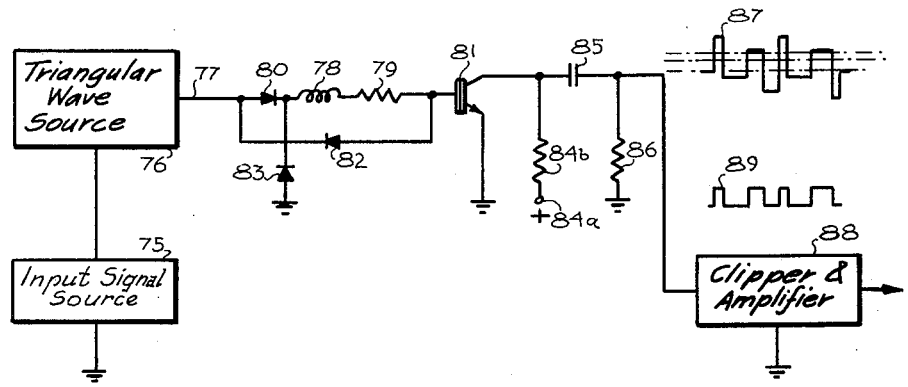
FIG. 5 is a combined block and schematic circuit diagram of an alternative system for generating a signal train of width modulated pulses in accordance with the invention.

In FIG. 5 there is illustrated an alternative arrangement for generating a signal train comprising width modulated pulses in accordance with the invention. In FIG. 5 input signals from an input signal source 75 are combined with an alternating current wave from a triangular wave source 76 to produce a composite signal on the lead 77, having both an alternating current component and a component representing the value of signals from the input signal source 75. The composite signal appearing on the lead 77 is passed to a constant current load comprising an inductance 78 and a resistor 79 via two separate circuit paths which function in a manner similar to the bridge rectifier circuits described above in connection with FIGS. 1 and 3. During positive going excursions of the composite signal appearing on the lead 77 above the zero axis, current is passed via a diode 80, the inductance 78, the resistor 79 and a transistor 81 of an N-P-N variety which functions between its base and emitter as a diode to complete the circuit to ground reference potential. The circuit path for negative going excursions of the composite signal on the lead 77 below the zero axis is provided by means of the diode 82, the inductance 78, the resistor 79 and a diode 83. Since the inductance 78 and the resistor 79 tend to sustain a constant current flow, the composite signal 77 is alternately passed via the circuit paths of the diodes 80 and 82 to produce a signal train of width modulated pulses in a manner similar to that described and illustrated in the graphical illustration of FIG. 2 above. Accordingly, at the collector of the transistor 81 there appears a signal train of width modulated pulses.

A positive operating potential may be applied to the collector of the transistor 81 from a conventional power supply via a terminal 84a and a load resistor 84b. The signal train appearing at the collector of the transistor 81 may be passed via a capacitor 85 to appear across a resistor 86. As is well known, where an alternating current wave is passed by a capacitor, the wave tends to center itself around a zero axis as indicated by the waveform 87. A signal train of constant amplitude pulses 89 for use in terminal equipment may be derived from the wave 87 by means of a clipper and amplifier circuit 88.

By means of the invention there is provided a new and improved signal multiplying system for generating an output signal representing a product of two variables having a simplicity and superiority of operation not heretofore known. The apparatus is capable of operating in four quadrants, that is, capable of accepting any combination of polarity of input signals and provides an output signal having a value and polarity corresponding to the product of the input signals. In addition, the apparatus is capable of an extremely accurate multiplication process without requiring moving mechanical parts. Through the use of the means for generating a signal train of width modulated pulses in accordance with the invention, a simple and straight-forward apparatus for the multiplication of variables represented by electrical signals is provided. Although particular exemplary arrangements of the invention have been illustrated, it will be understood that these are given by way of example only. Accordingly, the invention should be considered to include any and all equivalent arrangements falling within the scope of the annexed claims.

I claim:

1. A signal multiplication system including the combination of a source of signals representing a first variable, a source of triangular waves connected serially with the first signal source, an inductively loaded bridge rectifier circuit connected to the triangular wave source for producing a pulse width modulated wave in accordance with the value of the signal from the first signal source, a second signal source representing a second variable, an output impedance, and switching means connected between the inductively loaded bridge rectifier circuit and the second signal source for alternately and oppositely applying a signal from the second signal source to the output impedance in accordance with the pulse width modulated wave produced by the bridge rectifier circuit whereby a signal appears across the output impedance representing the product of the first and second variables.

2. A signal multiplication system including the combination of a first input signal source representing a first variable, a triangular wave source connected to the input signal source for producing a composite wave representing the sum of the signal from the first input signal source and a triangular wave from the triangular wave source, an inductively loaded bridge circuit for producing a pulse width modulated wave in response to the composite signal, a second input signal source representing a second variable, an output circuit, and means connected between the inductively loaded bridge circuit and the second signal source for applying a signal derived from the second signal source to the output circuit for alternate periods in opposite polarity with the length of each alternate period corresponding to the time interval of each of the width modulated pulses whereby a signal appears in the output circuit representing the product of the first and second variables.

3. An electrical signal multiplying system for providing an output signal representing the product of two input signals including the combination of a first source of input signals, a triangular wave source, said first input signal and said triangular wave source being interconnected to provide a composite signal representing the sum of a triangular wave and a signal from the first input signal source, a bridge rectifier circuit for receiving the composite signal, a constant current load connected to the bridge rectifier circuit whereby the bridge rectifier circuit functions to generate a pulse width modulated wave representing the signal from the first signal source, a second input signal source, an output circuit, means connected between the bridge rectifier and the second signal source for applying a signal derived from the second signal source to the output circuit for alternate periods in opposite polarity with the length of each alternate period corresponding to the time interval of each of the width modulated pulses, and a filter connected in the output circuit for averaging the signals of alternately opposite polarity to produce an averaged output signal representing the product of the input signals from the first and second input signal sources.

4. An electrical signal multiplication system including the combination of a first input signal source, a source of triangular waves connected to the first input signal source, a bridge rectifier circuit adapted to receive a composite wave representing signals from the first input signal source and a wave from the triangular wave source, a constant current load connected across the bridge rectifier circuit so that current flow through the bridge rectifier circuit comprises width modulated pulses representing the value of the signal from the first input signal source, a second input signal source, an output circuit, a first signal responsive switch connected between the second input signal source and the output circuit, means coupling the bridge rectifier circuit to the first signal responsive switch for applying a signal derived from the second input signal source to the output circuit in response to the width modulated pulses from the bridge rectifier, a second signal responsive switch connected between the second input signal source and the output circuit, and means coupling the bridge rectifier circuit to the second signal responsive switch for applying a signal derived from the second input signal source to the output circuit in response to periods between width modulated pulses whereby a signal appears in the output circuit representing the product of the values of the signals from the first and second input signal sources.

5. An electrical signal multiplication system for producing an output signal representing the product of two variables including the combination of a first input signal source representing a first variable, an alternating wave source connected serially with the first input signal source, a bridge rectifier circuit adapted to receive a composite signal representing the sum of the signal from the first input signal source and the alternating current wave from the alternating current wave source, a constant current load connected across the bridge rectifier circuit, said bridge rectifier circuit being adapted to produce a switching wave comprising a pulse width modulated signal train representing the value of a signal from the first input signal source, a second input signal source representing a second variable, an output circuit, a first signal responsive switch connected between the second input signal source and the output circuit, means coupling the bridge rectifier circuit to the first signal responsive switch for applying a signal derived from the second input signal source to the output circuit in response to the width modulated pulses in the signal train, a polarity reverser connected to the second input signal source, a second signal responsive switch connected between the polarity reverser and the output circuit, and means coupling the bridge rectifier circuit to the second signal responsive switch for applying a signal derived from the polarity reverser to the output circuit in response to periods in said signal train between width modulated pulses whereby a signal appears in the output circuit representing the product of the two variables represented by the signals from the first and second input sources.

6. An electrical signal multiplication system in accordance with claim 5 in which a filter is connected to the output crcuit to average the signals applied thereto by the first and second signal responsive switches to produce an output signal representing the product of the two variables.

7. An electrical signal multiplying system including the combination of a first input signal source for producing a signal representing a first variable, means adding a time varying electrical signal to a signal derived from the first input signal source, an inductively loaded bridge rectifier circuit coupled to the signal adding means for generating a switching wave having positive and negative going excursions which differ in time in accordance with the value of a signal from the first input signal source, a second input signal source for providing a signal representing a second variable quantity, an output impedance, a first signal responsive switch connected between the second input signal source and the output impedance, means coupling the bridge rectifier circuit to the first signal responsive switch for applying the signal from the second input signal source to the output impedance in response to positive going excursions of the switching wave, a second signal responsive switch connected between the second input signal source and the output impedance, and means coupling the bridge rectifier circuit to the second signal responsive switch for applying the signal from the second input signal source to the output impedance in response to negative going excursions of the switching wave whereby an output signal appears across the output impedance representing the product of the signals from the first and second input signal sources.

8. An electrical signal multiplying system including the combination of a first input signal source for producing a signal representing a first variable, means adding a time varying electrical signal to a signal derived from the first input signal source, an inductively loaded bridge rectifier circuit coupled to the signal adding means for generating a switching wave having positive and negative going excursions which differ in time in accordance with the value of a signal from the first input signal source, a second input signal source, an output impedance, a first signal responsive switch connected to the output impedance, means applying signals from the second input signal source to the first signal responsive switch in one given polarity, means coupling the bridge rectifier circuit to the first signal responsive switch for applying signals from the second input signal source to the output impedance in response to the pulses in the switching wave, a second signal responsive switch connected to the output impedance, a polarity reverser connected between the second input signal source and the second signal responsive switch, and means coupled between the bridge rectifier circuit and the second signal responsive switch for applying a reversed polarity signal from the second input signal source supplied by the polarity reversing means to the output impedance representing the product of the variables represented by the signals from the first and second input signal sources.

9. An electrical signal multiplying system including the combination of a multiplier signal source, means connected to the multiplier signal source for generating a composite wave having a component representing the value of the signal from the multiplier signal source and an alternating component, a bridge rectifier circuit coupled to the composite wave generating means, a constant current load connected across the bridge rectifier circuit for causing the bridge rectifier circuit to pass current pulses of substantially constant amplitude and variable width in accordance with the value of the signal from the multiplier signal source, a multiplicand signal source, an output circuit, and a pair of switching circuits coupled to the bridge rectifier circuit and the multiplicand signal source for alternately passing a signal from the multiplicand signal source to the output circuit in response to the variable width pulses passed by the bridge rectifier circuit whereby an output signal appears in the output circuit having a component representing the product of the signals from the multiplier and multiplicand input signal sources.

10. An electrical signal multiplying system including the combination of a multiplier signal source, means connected to the multiplier signal source for generating a composite wave having a component representing the value of the signal from the multiplier signal source and an alternating component, a bridge rectifier circuit coupled to the composite wave generating means, a constant current load connected across the bridge rectifier circuit for causing the bridge rectifier circuit to pass current pulses of substantially constant amplitude and variable width in accordance with the value of the signal from the multiplier signal source, a plurality of multiplicand signal sources, a plurality of output circuits, and a plurality of switching circuits coupled between the multiplicand signal sources and the bridge rectifier circuit for alternately and oppositely applying signals from each of the multiplicand signal sources to each of the output circuits in response to the variable width current pulses passed by the bridge rectifier circuit whereby a signal appears across each of the output circuits representing the product of the signal from the multiplier input signal source and one of the multiplicand input signal sources.

11. An electrical circuit for generating a pulse width modulated signal train including the combination of a bridge rectifier circuit, a constant current load connected across the bridge rectifier circuit, means for generating a signal having an alternating component and a direct current component connected to the bridge rectifier circuit, and an output circuit connected to the bridge rectifier circuit for receiving variable width pulses modulated in accordance with said direct current component.

12. An electrical circuit for generating a signal train comprising width modulated pulses including the combination of an input signal source, a triangular wave source connected serially with the input signal source, a constant current device, a first unidirectional current path connected between the triangular wave source and one end of the constant current device for passing currents of one polarity, a second unidirectional current path connected between the triangular wave source and the other end of the constant current device for passing currents of opposite polarity, and an output circuit connected serially with said first and second unidirectional current paths in which appears a series of width modulated pulses representing the value of the signal from the input signal source.

13. An electrical circuit for generating a signal train comprising width modulated pulses including the combination of an input signal source, an alternating wave source connected serially with the input signal source, a bridge rectifier circuit adapted to receive a composite signal representing the sum of the signal from the input signal source and the alternating current wave from the alternating current wave source, a constant current load connected across the bridge rectifier circuit, and an output circuit connected serially with the bridge rectifier circuit in which appears a series of width modulated pulses representing the value of the signal from the input signal source.

14. An electrical circuit for generating a signal train comprising width modulated pulses including the combination of an input signal source, an alternating wave source connected serially with the input signal source, a bridge rectifier circuit adapted to receive a composite signal representing the sum of the signal from the input signal source and the alternating current wave from the alternating current wave source, an inductance connected across the bridge rectifier circuit for passing a substantially constant current and an output circuit connected serially with the bridge rectifier circuit in which appears a series of width modulated pulses representing the value of the signal from the input signal source.

References Cited in the file of this patent

UNITED STATES PATENTS

| | | |
|---|---|---|
| 2,116,559 | Caruthers | May 10, 1938 |
| 2,223,860 | Wise | Mar. 4, 1941 |
| 2,441,983 | Young | May 25, 1948 |
| 2,490,026 | Buckbee | Dec. 6, 1949 |
| 2,674,409 | Lakatos | Apr. 6, 1954 |
| 2,773,641 | Baum | Dec. 11, 1956 |
| 2,808,990 | Van Allen | Oct. 8, 1957 |
| 2,835,444 | Blake et al. | May 20, 1958 |
| 2,866,103 | Blake et al. | Dec. 23, 1958 |
| 2,891,726 | Decker et al. | June 23, 1959 |

OTHER REFERENCES

Electronics (Keister), October 1956, pp. 160–163.